United States Patent
Fan

(10) Patent No.: US 11,675,261 B2
(45) Date of Patent: Jun. 13, 2023

(54) ILLUMINATION SYSTEM AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/499,891

(22) Filed: Oct. 13, 2021

(65) Prior Publication Data

US 2022/0128895 A1    Apr. 28, 2022

(30) Foreign Application Priority Data

Oct. 28, 2020 (CN) .......................... 202022434617.8

(51) Int. Cl.
G03B 21/20 (2006.01)
G02B 27/30 (2006.01)

(52) U.S. Cl.
CPC .......... *G03B 21/208* (2013.01); *G02B 27/30* (2013.01); *G03B 21/2066* (2013.01)

(58) Field of Classification Search
CPC ........ G03B 21/20; G02B 27/30; G02B 26/10; G02B 5/02; G02B 27/10; G02B 27/48; G02B 27/09
See application file for complete search history.

(56) References Cited

U.S. PATENT DOCUMENTS

| | | | | |
|---|---|---|---|---|
| 2006/0274279 | A1* | 12/2006 | Yoshii | G03B 21/28 348/E9.027 |
| 2010/0165307 | A1* | 7/2010 | Mizushima | G02B 27/0961 359/629 |
| 2014/0333900 | A1* | 11/2014 | Aboshi | G03B 21/2033 353/38 |
| 2020/0301263 | A1* | 9/2020 | Li | G03B 21/208 |

FOREIGN PATENT DOCUMENTS

| | | |
|---|---|---|
| CN | 110596999 | 12/2019 |
| TW | 201019293 | 5/2010 |

* cited by examiner

*Primary Examiner* — Sultan Chowdhury
*Assistant Examiner* — Danell L Owens
(74) *Attorney, Agent, or Firm* — JCIPRNET

(57) ABSTRACT

Provided is an illumination system for providing an illumination beam. The illumination system includes at least one light source, a movable reflective element, a lens element, and a light uniformizing element. The light source is configured to emit at least one beam. The beam is reflected by the movable reflective element, and then passes through the lens element and the light uniformizing element to form an illumination beam. An optical effective area of the beam on the lens element is configured to be larger than that of the beam on the movable reflective element by motion of the movable reflective element. The optical effective area is an area of a union of each beam that irradiates the lens element or the movable reflective element at different times. A projection device is also provided. The illumination system and projection device provide a uniformized illumination beam and improve the projection effect.

18 Claims, 3 Drawing Sheets

ILLUMINATION SYSTEM AND PROJECTION DEVICE

CROSS-REFERENCE TO RELATED APPLICATION

This application claims the priority benefit of China application serial no. 202022434617.8, filed on Oct. 28, 2020. The entirety of the above-mentioned patent application is hereby incorporated by reference herein and made a part of this specification.

BACKGROUND

Technical Field

The disclosure relates to an optical system and an optical device, and particularly relates to an illumination system and a projection device.

Description of Related Art

Generally speaking, a laser projection device uses a collimated laser light source to emit a laser light. The laser light is focused by a lens element and then enters a light uniformizing element to be uniformized. Alternatively, after the laser light passes through a light diffusing element and a light uniformizing element to uniformly shape the light, a light valve is used to control the gray scale of the image. Finally, an image beam passes through a projection lens and is projected as an image.

However, in the above-mentioned structure, the angles at which laser lights of different wavelengths enter the light uniformizing element are not consistent. As a result, after the laser lights pass through the light uniformizing element, there is a certain interval between the light spots of the laser lights of different wavelengths, resulting in that the projected image has the problem of poor light color uniformity. In fact, the above-mentioned inconsistency does not only occur when the projection device uses a multi-colour laser (MCL) as the light source. Even if the light source of the projection device is a laser light source of multiple monochromatic modules, the incident angle of the laser light of each light color may be inconsistent from each other. Therefore, the projection device has problems such as non-uniform brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system and a projection device, which provide a uniformized illumination beam and improve the projection effect.

The disclosure provides an illumination system for providing an illumination beam. The illumination system includes at least one light source, a movable reflective element, a lens element, and a light uniformizing element. The at least one light source is configured to emit at least one beam. The at least one beam is sequentially reflected by the movable reflective element, and then passes through the lens element and the light uniformizing element to form an illumination beam. By motion of the movable reflective element, an optical effective area of the at least one beam on the lens element is configured to be larger than an optical effective area of the at least one beam on the movable reflective element. The optical effective area is an area of a union of each of the at least one beam that irradiates the lens element or the movable reflective element at different times.

The disclosure provides a projection device, which includes an illumination system, a light valve, and a projection lens. The illumination system is configured to provide an illumination beam. The illumination system includes at least one light source, a movable reflective element, a lens element, and a light uniformizing element. The at least one light source is configured to emit at least one beam. The at least one beam is reflected by the movable reflective element, and then passes through the lens element and the light uniformizing element to form an illumination beam. By motion of the movable reflective element, an optical effective area of the at least one beam on the lens element is configured to be larger than an optical effective area of the at least one beam on the movable reflective element. The optical effective area is an area of a union of each of the at least one beam that irradiates the lens element or the movable reflective element at different times. The light valve is arranged on a transmission path of the illumination beam for converting the illumination beam into an image beam. The projection lens is arranged on a transmission path of the image beam for projecting the image beam outside the projection device.

Based on the above, in the illumination system and the projection device according to the embodiments of the disclosure, by the motion of the movable reflective element, the optical effective area of the beam on the lens element is set larger than the optical effective area of the beam on the movable reflective element, so as to make the illumination beam of the illumination system more uniform. Therefore, the illumination system and the projection device according to the embodiments of the disclosure provide a better user experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
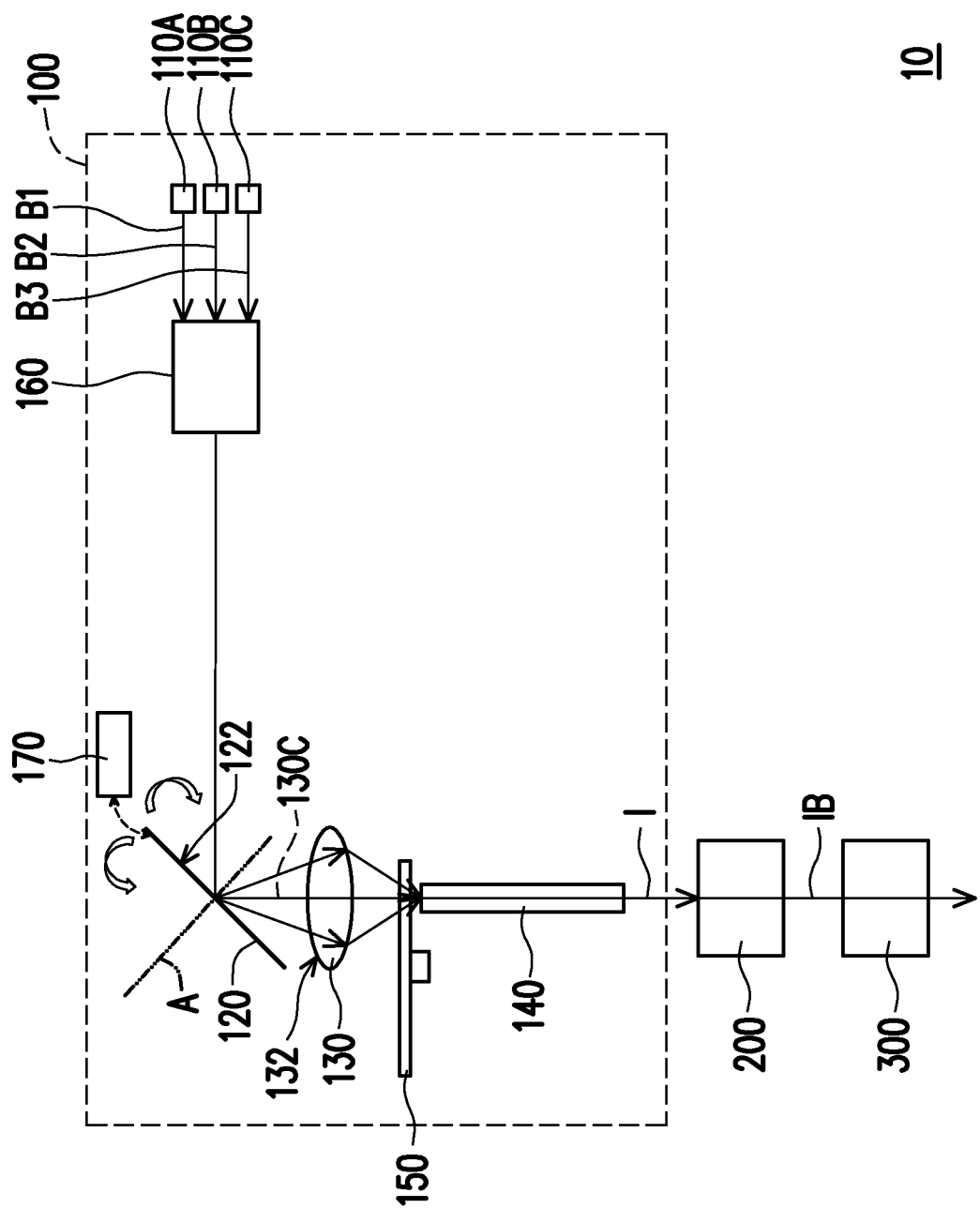
FIG. 1 is a schematic diagram of a projection device according to an embodiment of the disclosure.

FIG. 1 is a schematic diagram of a projection device according to an embodiment of the disclosure. Referring to FIG. 1, the projection device 10 of this embodiment includes an illumination system 100, a light valve 200, and a projection lens 300. The illumination system 100 is configured to provide an illumination beam I. The illumination system 100 includes at least one light source 110A, 110B, and 110C, a movable reflective element 120, a lens element 130, and a light uniformizing element 140. The light sources 110A, 110B, and 110C are configured to emit at least one beam B1, B2, and B3. The beams B1, B2, and B3 are reflected by the movable reflective element 120, and then pass through the lens element 130 and the light uniformizing element 140 to form the illumination beam I. The light valve 200 is arranged on the transmission path of the illumination beam I for converting the illumination beam I into an image beam IB. The projection lens 300 is arranged on the transmission path of the image beam IB for projecting the image beam IB outside the projection device 10.

In this embodiment, the light valve 200 is, for example, a spatial light modulator such as a digital micro-mirror device (DMD), a liquid-crystal-on-silicon panel (LCOS panel) or a liquid crystal panel (LCD). In this embodiment, one light valve 200 is provided. In other embodiments, more than one light valve 200 may be provided, but the disclosure is not limited thereto.

In this embodiment, the projection lens 300 includes, for example, one optical lens with refractive power or a combination of multiple optical lenses with refractive power. The optical lenses include, for example, various combinations of non-planar lenses such as biconcave lenses, biconvex lenses, concavo-convex lenses, convexo-concave lenses, plano-convex lenses, and plano-concave lenses. The disclosure is not intended to limit the form and type of the projection lens 300.

Specifically, the light sources 110A, 110B, and 110C of this embodiment are, for example, laser diodes (LD), light emitting diodes (LED), other suitable light sources or a combination thereof. Nevertheless, the disclosure is not limited thereto. In addition, the beams B1, B2, and B3 may be blue light, red light, green light or lights of other colors.

In this embodiment, the light sources 110A, 110B, and 110C may be multiple light sources, and the beams B1, B2, and B3 may be multiple beams, wherein the beams B1, B2, and B3 have at least two peak wavelengths. The light sources 110A, 110B, and 110C are, for example, multi-colour lasers (MCL) with different light colors or light sources of multiple monochromatic modules, but the disclosure is not limited thereto. In an embodiment, one light source may be provided, or the light sources may have one peak wavelength.

In this embodiment, the beams B1, B2, and B3 emitted from the light sources 110A, 110B, and 110C are respectively incident on a reflective surface 122 of the movable reflective element 120 at different times. In addition, the illumination system 100 further includes an actuation module 170. The actuation module 170 may be an actuator, a motor or a device using a piezoelectric material, but the disclosure is not limited thereto. The actuation module 170 is connected to the movable reflective element 120, which enables the movable reflective element 120 generates movement, rotation or vibration in one dimension, two dimensions, and three dimensions along a motion axis A thereof. In this way, even if the spatial configurations of the light sources 110A, 110B, and 110C are different, causing different beams B1, B2, and B3 to be incident on the reflective surface 122 of the movable reflective element 120 at different angles, the positions of the beams B1, B2, and B3 projected on a light incident surface 132 of the lens element 130 at different times can substantially fall at the intersection of the light incident surface 132 and the optical axis 130C of the lens element 130 by the motion of the movable reflective element 120.

In this embodiment, the motion mode of the movable reflective element 120 can be designed for the beams B1, B2, and B3. For example, if the light spots of the beams B1, B2, and B3 emitted by the light sources 110A, 110B, and 110C are long and narrow, the movable reflective element 120 can be designed to move in the short side direction of the beams B1, B2, and B3. As a result, the short sides of the beams B1, B2, and B3 reflected from the movable reflective element 120 are enlarged, so that the reflected beams B1, B2, and B3 are round or square. Alternatively, the motion of the movable reflective element 120 can be designed to adjust the reflected beams B1, B2, and B3 to a desired shape. Furthermore, the motion of the movable reflective element 120 may magnify the reflected beams B1, B2, and B3 in equal proportions.

In this embodiment, the actuation module 170 causes the movable reflective element 120 to move at a motion frequency greater than or equal to 60 Hz. Since the motion frequency of the movable reflective element 120 is greater than the recognition rate of the human eye, the projection device 10 according to the embodiment of the disclosure provides a better user experience. In an exemplary embodiment, the actuation module 170 causes the movable reflective element 120 to move at a motion frequency greater than or equal to 60 Hz and less than or equal to 1000 Hz.

In this embodiment, by the motion of the movable reflective element 120, the optical effective area of the beams B1, B2, and B3 on the lens element 130 (the light incident surface 132) is larger than the optical effective area of the beams B1, B2, and B3 on the movable reflective element 120 (the reflective surface 122), wherein the optical effective area is the area of a union of each of the beams B1, B2, and B3 that irradiates the lens element 130 or the movable reflective element 120 at different times. In an exemplary embodiment, the ranges of the optical effective areas of the beams B1, B2, and B3 on the lens element 130 (the light incident surface 132) are the same. In other words, the difference between the reflected beams B1, B2, and B3 at the edges of the light spots is reduced. Therefore, the uniformity of the illumination beam I generated by the illumination system 100 is improved.

In this embodiment, the light uniformizing element 140 uniformizes the beams B1, B2, and B3 that pass through. The light uniformizing element 140 is, for example, an integration rod, a lens array, or other optical elements with a light uniformizing effect, but the disclosure is not limited thereto.

In an embodiment, the illumination system 100 further includes a light combining module 160. The light combining module 160 is configured to make the beams B1, B2, and B3 incident on the reflective surface 122 of the movable reflective element 120 at the motion axis A of the movable reflective element 120. In another embodiment, the light combining module 160 makes the beams B1, B2, and B3 incident on the reflective surface 122 of the movable reflective element 120 at the motion axis A of the movable reflective element 120 in parallel to each other.

The light combining module 160 includes, for example, a module composed of optical elements such as a lens, a reflector, and a transflective reflector. However, the disclosure is not limited thereto. The type and the number of the optical elements used in the light combining module 160 are determined by the requirements of the illumination system 100 in terms of the design of the light path. In the illumination system 100 according to the embodiment of the disclosure, since the illumination system 100 includes the light combining module 160 which makes the beams B1, B2, and B3 incident on the reflective surface 122 of the movable reflective element 120 at the motion axis A of the movable reflective element 120 in parallel to each other, the illumination system 100 provides the illumination beam I with improved uniformity.

In this embodiment, the wavelength of each of the beams B1, B2, and B3 that irradiates the lens element 130 does not change with time.

In this embodiment, the same beam B1, B2, B3 that irradiates the lens element 130 and the movable reflective element 120 has the same wavelength.

In this embodiment, the projection device 10 further includes a light diffusing element 150. The light diffusing element 150 is arranged between the lens element 130 and the light uniformizing element 140 on the transmission path of the beams B1, B2, and B3. In this embodiment, the light diffusing element 150 is, for example, a diffuser wheel for further scattering the beams B1, B2, and B3 to reduce or eliminate the speckles. When the beams B1, B2, and B3 are laser beams, the coherence of the laser beams can be destroyed.

In an embodiment, the movable reflective element 120 may be a total reflective mirror or a white reflective sheet. When the movable reflective element 120 is a total reflective mirror, the light energy utilization efficiency of the illumination system 100 is improved. When the movable reflective element 120 is a white reflective sheet, since the white reflective sheet is a reflective sheet with a diffusing effect, the uniformity of the illumination beam I generated by the illumination system 100 is improved. In addition, because the light exit point of the movable reflective element 120 is in the central area (optical effective area) of the reflective surface 122, and the beams B1, B2, and B3 happen to be imaged at the entrance (light entrance point) of the light uniformizing element 140 after starting from the light exit point, it is possible to ensure that the highest proportion of the beams B1, B2, and B3 enters the light uniformizing element 140. That is, the projection device 10 achieves the highest imaging efficiency.

In another embodiment, the movable reflective element 120 may be a transflective reflector. When the movable reflective element 120 is a transflective reflector, a part of the beams B1, B2, and B3 is reflected by the movable reflective element 120 to form the illumination beam I, and a part of the beams B1, B2, and B3 passes through the movable reflective element 120 to form another light path. For example, the beams B1, B2, and B3 passing through the movable reflective element 120 form another illumination beam, and pass through another light valve and another projection lens to form another image beam. In other words, the projection device 10 may have multiple image beams, so as to project multiple different images.

Based on the above, in the illumination system 100 and the projection device 10 according to the embodiment of the disclosure, by the motion of the movable reflective element 120, the positions of the beams B1, B2, and B3 projected on the light incident surface 132 of the lens element 130 at different times can substantially fall at the intersection of the light incident surface 132 and the optical axis 130C of the lens element 130. As a result, the illumination system 100 reduces the interval between the light spots generated by different beams B1, B2, and B3 that are incident on the reflective surface 122 of the movable reflective element 120 at different angles. Therefore, the illumination quality of the illumination system 100 according to the embodiment of the disclosure is improved, and the color uniformity of the image projected by the projection device 10 is further improved. Furthermore, by the motion of the movable reflective element 120, the optical effective area of the beams B1, B2, and B3 on the lens element 130 is set larger than the optical effective area of the beams B1, B2, and B3 on the movable reflective element 120, which further uniformizes the illumination beam I of the illumination system 100. Therefore, the illumination system 100 and the projection device 10 according to the embodiment of the disclosure provide a better user experience.

Furthermore, the light spot of the beam B1 that irradiates the lens element 130 at different times may at least partially overlap or not overlap to enlarge the optical effective area, but since it does not go beyond the light incident surface 132 of the lens element 130, all the beam B1 can be transmitted to the light uniformizing element 140 without wasting any part of the beam B1. In addition, the beams B2 and B3 also achieve the same effect because of the configuration of the light path. Therefore, the projection device according to the disclosure can maintain the brightness.

Figure 2:
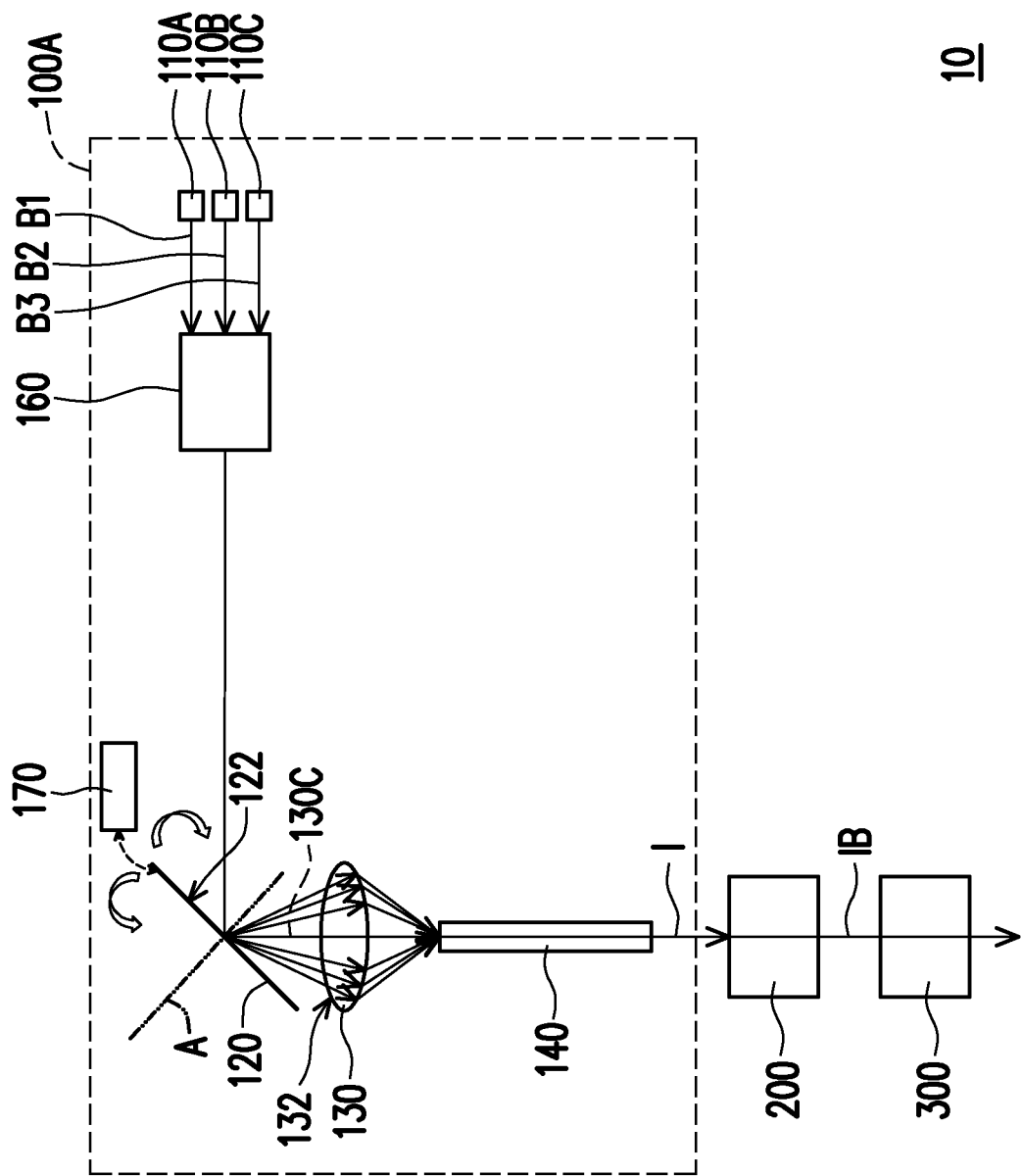
FIG. 2 is a schematic diagram of a projection device according to another embodiment of the disclosure.

FIG. 2 is a schematic diagram of a projection device according to another embodiment of the disclosure. Referring to FIG. 2, the illumination system 100A in the projection device 10 of FIG. 2 is similar to the illumination system 100 in the projection device 10 of FIG. 1, and the main difference is as follows. In this embodiment, the light diffusing element 150 is omitted from the illumination system 100A. In this case, the movable reflective element 120 preferably uses a white reflective sheet. That is to say, by the motion of the movable reflective element 120, the illumination system 100A according to the embodiment of the disclosure can generate the illumination beam I with good quality. Therefore, the light energy utilization efficiency of the illumination system 100A is improved and the cost is lower.

Figure 3:
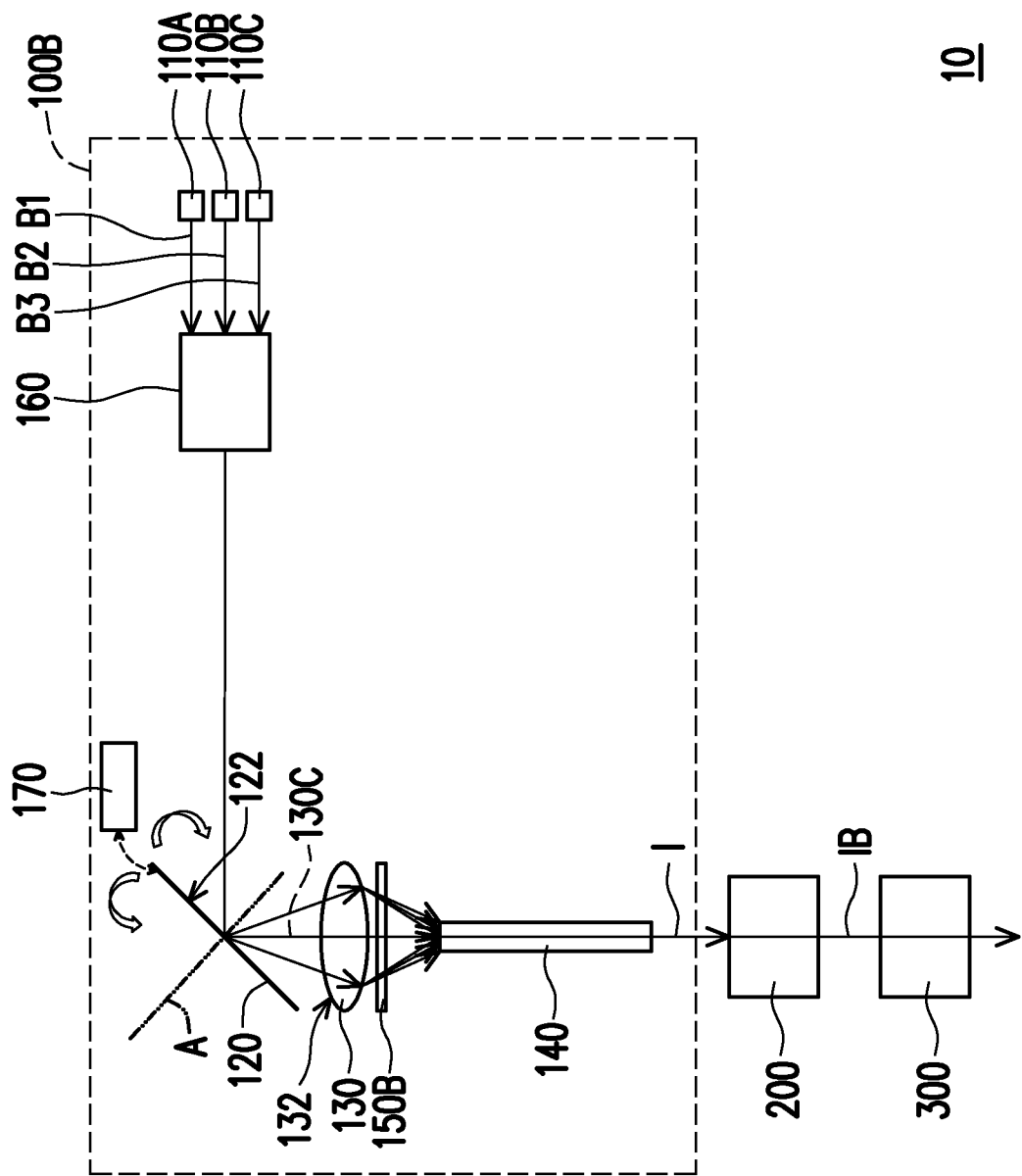
FIG. 3 is a schematic diagram of a projection device according to another embodiment of the disclosure.

FIG. 3 is a schematic diagram of a projection device according to another embodiment of the disclosure. Referring to FIG. 3, the illumination system 100B in the projection device 10 of FIG. 3 is similar to the illumination system 100 in the projection device 10 of FIG. 1, and the main difference is as follows. In this embodiment, the light diffusing element 150B is, for example, a diffusing plate. Since the illumination system 100B according to the embodiment of the disclosure uses the light diffusing element 150B, in addition to the functions of the light diffusing element 150 described above, the use of the light diffusing element 150B further enlarges the light spots of the beams B1, B2, and B3, and reduces the sizes of the illumination system 100B and the projection device 10.

In another embodiment, the illumination system 100 or the illumination system 100B can be provided with both the light diffusing elements 150 and 150B.

In summary, in the illumination system and the projection device according to the embodiments of the disclosure, by the motion of the movable reflective element, the illumination system reduces the interval between the light spots generated by different beams that are incident on the movable reflective element at different angles. Therefore, the illumination quality of the illumination system according to the embodiments of the disclosure is improved, and the color uniformity of the image projected by the projection device is further improved. Furthermore, by the motion of the movable reflective element, the optical effective area of the beam on the lens element is larger than the optical effective area of the beam on the movable reflective element, which further uniformizes the illumination beam of the illumination system. Therefore, the illumination system and the projection device according to the embodiments of the disclosure provide a better user experience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system configured to provide an illumination beam, the illumination system comprising at least one light source, a movable reflective element, a lens element, and a light uniformizing element, wherein:
   the at least one light source is configured to emit at least one beam, and the at least one beam is reflected by the movable reflective element and then passes through the lens element and the light uniformizing element to form the illumination beam; and
   an optical effective area of the at least one beam on the lens element is configured to be larger than an optical effective area of the at least one beam on the movable reflective element by motion of the movable reflective element, and the optical effective area of the at least one beam on the lens element is configured to be larger than an optical effective area of the at least one beam on an entrance of the light uniformizing element, wherein the optical effective area is an area of a union of each of the at least one beam that irradiates the lens element, the entrance of the light uniformizing element or the movable reflective element at different times.

2. The illumination system according to claim 1, wherein a wavelength of each of the at least one beam that irradiates the lens element does not change with time.

3. The illumination system according to claim 1, wherein a same beam that irradiates the lens element and the movable reflective element has a same wavelength.

4. The illumination system according to claim 1, wherein the motion of the movable reflective element comprises movement, rotation or vibration in one dimension, two dimensions, and three dimensions.

5. The illumination system according to claim 1, wherein a motion frequency of the movable reflective element is greater than or equal to 60 Hz and less than or equal to 1000 Hz.

6. The illumination system according to claim 1, further comprising a light diffusing element, which is arranged between the lens element and the light uniformizing element on a transmission path of the at least one beam.

7. The illumination system according to claim 1, wherein the movable reflective element is a total reflective mirror, a transflective reflector or a white reflective sheet.

8. The illumination system according to claim 1, wherein the at least one light source comprises a plurality of light sources, and the plurality of light sources generate a plurality of beams, and the plurality of beams have at least two peak wavelengths.

9. The illumination system according to claim 1, wherein the at least one beam is incident on a reflective surface of the movable reflective element at a motion axis of the movable reflective element in parallel to each other.

10. A projection device, comprising an illumination system, a light valve, and a projection lens, wherein:
the illumination system is configured to provide an illumination beam, and the illumination system comprises at least one light source, a movable reflective element, a lens element, and a light uniformizing element, wherein:
the at least one light source is configured to emit at least one beam, and the at least one beam is reflected by the movable reflective element and then passes through the lens element and the light uniformizing element to form the illumination beam;
an optical effective area of the at least one beam on the lens element is configured to be larger than an optical effective area of the at least one beam on the movable reflective element by motion of the movable reflective element, and the optical effective area of the at least one beam on the lens element is configured to be larger than an optical effective area of the at least one beam on an entrance of the light uniformizing element, wherein the optical effective area is an area of a union of each of the at least one beam that irradiates the lens element, the entrance of the light uniformizing element or the movable reflective element at different times;
the light valve is arranged on a transmission path of the illumination beam for converting the illumination beam into an image beam; and
the projection lens is arranged on a transmission path of the image beam for projecting the image beam outside the projection device.

11. The projection device according to claim 10, wherein a wavelength of each of the at least one beam that irradiates the lens element does not change with time.

12. The projection device according to claim 10, wherein a same beam that irradiates the lens element and the movable reflective element has a same wavelength.

13. The projection device according to claim 10, wherein the motion of the movable reflective element comprises movement, rotation or vibration in one dimension, two dimensions, and three dimensions.

14. The projection device according to claim 10, wherein a motion frequency of the movable reflective element is greater than or equal to 60 Hz and less than or equal to 1000 Hz.

15. The projection device according to claim 10, further comprising a light diffusing element, which is arranged between the lens element and the light uniformizing element on a transmission path of the at least one beam.

16. The projection device according to claim 10, wherein the movable reflective element is a total reflective mirror, a transflective reflector or a white reflective sheet.

17. The projection device according to claim 10, wherein the at least one light source comprises a plurality of light sources, and the plurality of light sources generate a plurality of beams, and the plurality of beams have at least two peak wavelengths.

18. The projection device according to claim 10, wherein the at least one beam is incident on a reflective surface of the movable reflective element at a motion axis of the movable reflective element in parallel to each other.

* * * * *